April 1, 1941.  C. D. HOCKING  2,236,710
AUTOMOBILE ANTIGLARE VISOR
Filed April 1, 1940  2 Sheets-Sheet 1
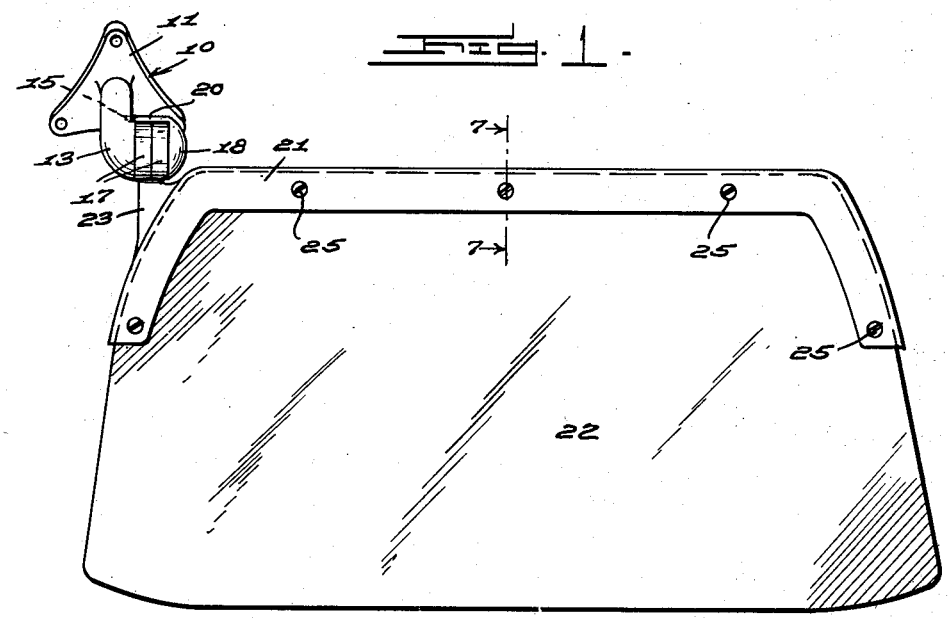
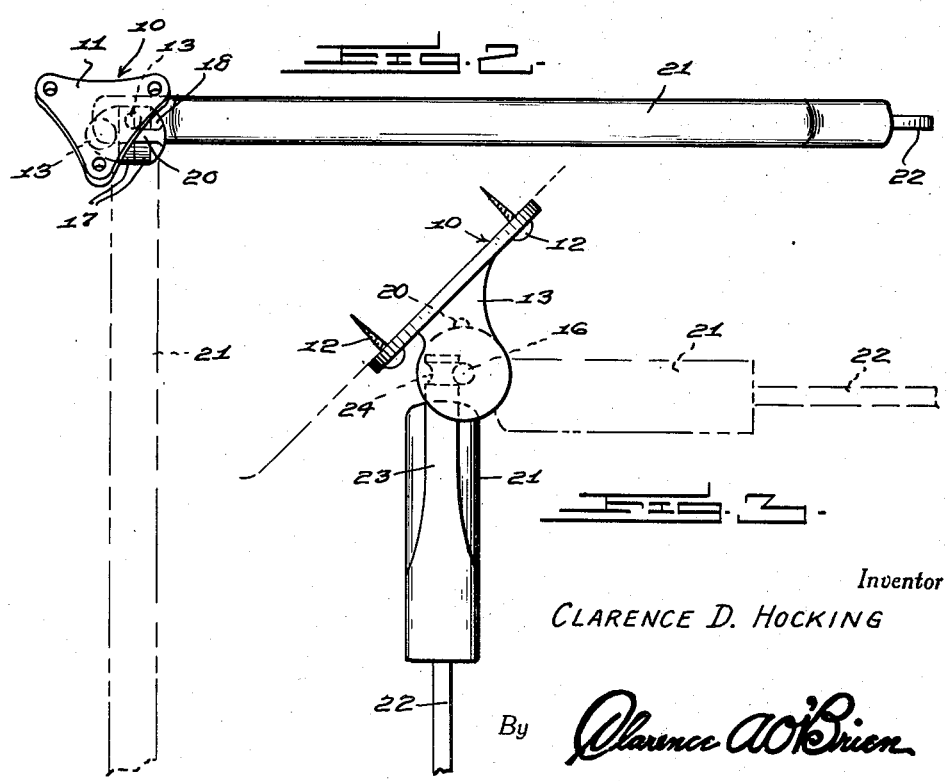
Inventor
CLARENCE D. HOCKING
By *Clarence A. O'Brien*
Attorney

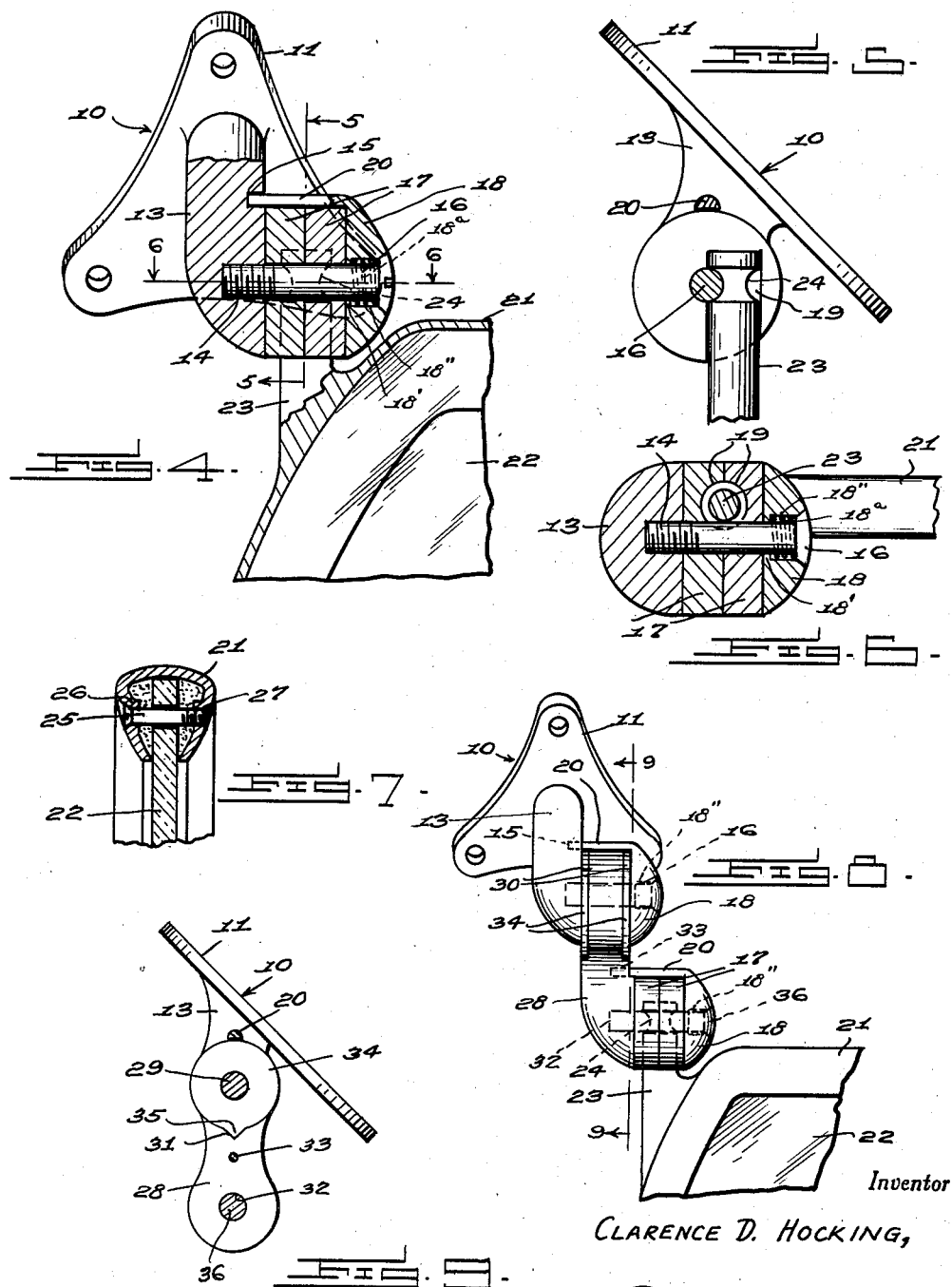

Patented Apr. 1, 1941

2,236,710

UNITED STATES PATENT OFFICE 2,236,710

AUTOMOBILE ANTIGLARE VISOR

Clarence D. Hocking, Los Angeles, Calif.

Application April 1, 1940, Serial No. 327,313

3 Claims. (Cl. 296—97)

The present invention relates to new and useful improvements in antiglare visors of the type used on automobiles and has for its primary object to provide a device of this character whereby the glare reflected from snow covered terrain or glare from on coming automobile headlights or any other bright light will be partially prevented from shining in the eyes of a driver of an automobile with the device mounted thereon.

Other objects of the invention are to provide an antiglare visor which will be attractive in appearance, easily manipulated, strong, durable, efficient and reliable in use, and which may be manufactured at low cost.

Still further objects and advantages of the invention will become apparent from a study of the following detailed description, taken in connection with the accompanying drawings, wherein like characters of reference designate corresponding parts throughout the several views, and wherein:

Figure 1 is a side elevational view of a device embodying my invention.

Figure 2 is a top plan view of the device.

Figure 3 is a fragmentary end elevational view of the device.

Figure 4 is an enlarged fragmentary elevational view of the device with parts broken away and shown in vertical section.

Figure 5 is a vertical sectional view taken substantially on the line 5—5 of Figure 4.

Figure 6 is a transverse sectional view taken substantially on the line 6—6 of Figure 4.

Figure 7 is an enlarged fragmentary vertical transverse sectional view taken substantially on the line 7—7 of Figure 1.

Figure 8 is a fragmentary elevational view embodying another form of the device.

Figure 9 is a vertical sectional view taken substantially on the line 9—9 of Figure 8.

Referring now to the drawings in detail, it will be seen that the reference numeral 10 designates generally a bracket adapted to be attached, by means of the plate 11, to the fore part of an automobile body, adjacent the driver, through the medium of screws or other means 12. The plate 11 has extending therefrom an arm 13 which has a threaded socket 14 in its outer end portion. The arm 13 further has a small recess 15 formed therein as shown in Figure 4 of the drawings.

A screw 16 is engaged in the threaded socket 14 and has mounted thereon a pair of washers 17 and a cap 18.

Each of the washers 17 has a groove 19 extending partially across one face.

The cap 18 has a bore 18' and a counterbore 18'' through which the screw 16 passes to hold the cap 18 and washers 17 on the arm 13. The cap further has a laterally extending tongue 20 the end of which engages in the recess 15 to hold the cap 18 and screw 16 against rotation when adjusting the position antiglare visor.

A compressible coil spring 18a is mounted in the counterbore 18'' about the screw 16 and is compressed between the head of the screw 16 and the bottom surface of the counterbore 18'' to maintain frictional contact between the washers 17 and the arm 13 and cap 18.

A channeled frame 21 is provided to hold a plate 22 constructed of any suitable translucent material and has formed at one end portion an upstanding post 23. The post 23 has a groove 24 around its top end portion which is adapted to receive the screw 16 when the post is mounted in the grooves 19 of the washers 17 which are mounted on the screw 16.

The translucent plate 22 is held within the frame 21 in any suitable manner but, the employment of screws 25 which pass through openings 26 in one side of the frame 21 and through holes in the translucent plate 22 and engage in threaded openings 27 in the other side of the frame, as shown in Fig. 7 of the drawings, is preferable.

In the form of the device shown in Fig. 8 an extension link 28 is provided to lower the level of the frame 21 and translucent plate 22.

The extension link 28 has an opening 29 therethrough at one end portion thereof, which end portion has flat parallel surfaces 30 and notches 31 formed therein. The other end portion of the extension link 28 has a threaded socket therein as at 32. A recess 33 is formed intermediate the end portions of the link 28. The top end portion of the extension link 28 is adapted to be attached to the extension arm 13 and held securely thereto by the cap 18 and screw 16.

Fiber washers 34, each having a projection 35, are mounted one on each side of the extension link 28 with the extension 35 of each seated in one of the notches 31 in the link 28.

A screw 36 is engaged in the threaded socket 32 in the end of the arm 28 to hold the post 23, through the medium of the washers 17 and cap 18, as shown in Fig. 8 of the drawings.

As can readily be seen, the frame 21 carrying the translucent plate 22 can be swung on the arm 13 in such a manner as to bring the plate 22 into the line of vision of an automobile operator either in front of him or at his left side, or the plate may be swung in a vertical plane and out of the way when not used.

Although I have shown and described herein a preferred embodiment of my invention, it is to be definitely understood that I do not desire to limit the application of the invention thereto, and any change or changes may be made in the structure or arrangement of the several parts within the spirit of the invention as claimed.

What is claimed is:

1. In a device of the character described, a support for an antiglare screen including a plate, an arm extending from said plate having a threaded socket and further having a recess therein, a screw threaded member engaged in said socket, a pair of grooved washers on said screw threaded member with their grooved faces opposed to each other, a grooved post mounted between said grooved washers and seated in the groove of each with the groove of the post partially about said screw threaded member, a frame extending from said grooved post, an antiglare screen in said frame, a cap on said screw threaded member engaged by the same to hold the grooved washers and grooved post supported on said screw threaded member, and a tongue extending from said cap engaged in said recess to hold said cap against rotation on said threaded member.

2. In a device of the character described, a support for an antiglare screen including a plate, an arm extending from said plate having a threaded socket and further having a recess therein, a screw threaded member engaged in said socket, a pair of grooved washers on said screw threaded member with their grooved faces opposed to each other, a grooved post mounted between said grooved washers and seated in the groove of each with the groove of the post partially about said screw threaded member, a frame extending from said grooved post, an antiglare screen in said frame, a cap having a bore and counterbore mounted on said screw threaded member adjacent one of said grooved washers, a compressible coil spring about said screw threaded member in said counterbore held in compressed condition by said screw threaded member to force said cap to hold said grooved members and said grooved post in frictional contact, and a tongue on said cap engaged in said recess to prevent rotation of said cap.

3. In a device of the character described, a support for an antiglare screen including a plate, an arm extending from said plate having a threaded socket and further having a recess therein, a screw threaded member engaged in said socket, a link swingably mounted on said threaded member, a washer at each side of said link on said screw threaded member, a cap on said screw threaded member for compression said link and washers when said screw threaded member is fed into said threaded socket, a tongue on said cap engaged in said recess to hold said cap against rotation, said link having a threaded socket and further having a recess therein, a screw threaded member engaged in said socket, a pair of grooved washers on said screw threaded member with their grooved faces opposed to each other, a grooved post mounted between said grooved washers and seated in the groove of each with the groove of the post partially about said screw threaded member, a frame extending from said grooved post, an antiglare screen in said frame, a cap on said screw threaded member engaged by the same to hold the grooved washers and grooved post supported on said screw threaded member.

CLARENCE D. HOCKING.